United States Patent
Cohen

(10) Patent No.: US 10,785,927 B1
(45) Date of Patent: Sep. 29, 2020

(54) IRRIGATION SYSTEM

(71) Applicant: Amir Cohen, Doar-Na Misgav (IL)

(72) Inventor: Amir Cohen, Doar-Na Misgav (IL)

( * ) Notice: Subject to any disclaimer, the term of this patent is extended or adjusted under 35 U.S.C. 154(b) by 0 days.

(21) Appl. No.: 16/561,034

(22) Filed: Sep. 5, 2019

(51) Int. Cl.
*A01G 25/06* (2006.01)
*A01G 27/04* (2006.01)
*E02F 5/10* (2006.01)

(52) U.S. Cl.
CPC ............... *A01G 25/06* (2013.01); *E02F 5/10* (2013.01)

(58) Field of Classification Search
CPC ......... A01G 25/06; A01G 27/06; A01G 27/04
USPC ...................................... 239/145; 405/43, 45
See application file for complete search history.

(56) References Cited

U.S. PATENT DOCUMENTS

| | | | | |
|---|---|---|---|---|
| 1,216,642 A | * | 2/1917 | White | A01G 27/04 47/80 |
| 1,247,766 A | * | 11/1917 | White | A01G 27/04 47/81 |
| 3,739,524 A | * | 6/1973 | Rose | A01G 27/04 47/81 |
| 4,057,933 A | * | 11/1977 | Enyeart | A01G 25/06 47/79 |
| 6,254,012 B1 | * | 7/2001 | Fan | A01G 27/005 239/145 |
| 8,979,431 B2 | * | 3/2015 | Bayley | A01G 25/02 137/78.3 |
| 2010/0132255 A1 | * | 6/2010 | Webber | A01G 27/04 47/29.1 |
| 2012/0230767 A1 | * | 9/2012 | desGarennes | E02B 11/00 405/45 |

FOREIGN PATENT DOCUMENTS

| | | | |
|---|---|---|---|
| DE | 102018102878 a1 | * | 8/2019 |
| GB | 654013 A | * | 5/1951 |
| JP | 2017-51139 A | * | 3/2017 |

OTHER PUBLICATIONS

Machine translation JP 2017-51139, Mar. 2017, 4pages. (Year: 2017).*
Machine Translation DE 102018102878, Aug. 2019, 9 pages. (Year: 2019).*

* cited by examiner

*Primary Examiner* — Sunil Singh

(57) ABSTRACT

A flowing water channel device comprises a tubular conduit made of fluid impervious material, and a plurality of orifices extending along a longitudinal axis of said tubular conduit. Within each of the plurality of orifices, an interior plurality of strands pass from the orifice to an interior of the tubular conduit, an exterior plurality of strands pass from the orifice to an exterior of the tubular conduit, and an intermediate plurality of strands are interlaced with the interior and exterior plurality of strands and configured at least partially within the orifice. Each of the interior plurality of strands, exterior plurality of strands, and intermediate plurality of strands is made of a fluid permeable material.

18 Claims, 6 Drawing Sheets

IRRIGATION SYSTEM

BACKGROUND

The present invention, in some embodiments thereof, relates to irrigation with uniform fluid distribution under low fluid pressure and, more specifically, but not exclusively, to a device that employs molecular forces to distribute water from a conduit to the soil.

Current irrigation technology, for example drip irrigation, greatly reduces wastage of water, both through reduced evaporation and concentrating location of irrigation to areas that are accessible to the target plants. A limitation of drip technology is that it requires relatively high pressure, typically 2-3 standard atmospheres (ATM). In addition, due to principles of fluid dynamics, the pressure in a drip irrigation pipe will be reduced as a result of each drip outlet. As a result, the amount of water distributed at a given point is reduced proportional to the number of drip outlets between the point and the pressure source.

Given the limitations mentioned above, drip irrigation has limited application in areas that lack water source with sufficient pressure, and/or lack economic means to artificially the increase pressure of supplied water. Many areas in the underdeveloped world are therefore not able to gain the efficiency benefits of drip irrigation. In the developed world, where commercial farming may require irrigation pipes hundreds of meters long, uniform distribution of water along the length of a field requires complicated logistics due to loss of pressure over the length of a drip system.

U.S. patent application Ser. No. 15/547,530, now U.S. Pat. No. 10,182,535, by the same inventor as the present application, and the contents of which are incorporated herein by reference, discloses a flowing water channel device. The flowing water channel device comprises a tubular conduit made of fluid impervious material and at least one slit extending along a longitudinal axis of the tubular conduit. A first and a second marginal edge of the tubular conduit are opposing to one another. At least one fluid permeable sheet material layer passes via the at least one slit and has a first marginal portion spread within the tubular conduit along the longitudinal axis and a second marginal portion spread outside of the tubular conduit along the longitudinal axis.

SUMMARY

The above-described flowing water channel device requires water to be spread outside of the tubular conduit along the entire length of the tubular axis. This configuration may thus still require distribution of an undesirably large amount of water. For example, if crops are spaced at regular intervals along a row, it may be sufficient to irrigate the crops by distributing water along the row at similar regular intervals. In addition, in the above-described flowing water channel device, water flows out of the device via the slit only in one circumferential direction. In addition, the fluid permeable sheet extends from the slit only in a single direction. It may be necessary to deliver a larger quantity of water to ensure that the sufficient water spreads in multiple directions.

It is thus an objective of this invention to provide a flowing water channel device that improves upon the above-described devices.

According to a first aspect, a flowing water channel device comprises a tubular conduit made of fluid impervious material. A plurality of orifices extend along a longitudinal axis of the tubular conduit. Within each of the plurality of orifices, an interior plurality of strands pass from the orifice to an interior of the tubular conduit, and an exterior plurality of strands pass from the orifice to an exterior of the tubular conduit. An intermediate plurality of strands interlaced with the interior and exterior plurality of strands are configured at least partially within the orifice. Each of the interior plurality of strands, exterior plurality of strands, and intermediate plurality of strands are made of a fluid permeable material.

Advantageously, the orifices may be arranged in the flowing water channel device to distribute the fluid at desired intervals, while the interior and exterior plurality of strands spread the fluid in multiple directions from each of the orifices, to ensure sufficient delivery of fluid to the targeted areas.

In another implementation according to the first aspect, the fluid permeable material comprises material wherein fluid may flow through said material solely by force of capillary action, cohesion, adhesion, and/or other molecular forces. Advantageously, no additional energy source is required to distribute the fluid.

In another implementation according to the first aspect, the intermediate plurality of strands comprises a weave of said plurality of intermediate strands, such that a fluid may flow through said strands by force of capillary action, cohesion, adhesion, and/or other molecular forces. Advantageously, no additional energy source is required to distribute the fluid.

In another implementation according to the first aspect, the fluid permeable material comprises a weave made of material capable of transmitting fluid by capillary action. Advantageously, no additional energy source is required to distribute the fluid.

In another implementation according to the first aspect, the interior plurality of strands comprise one or more of (1) loose strands separate from one another or (2) a weave. Advantageously, the loose strands may draw water from the entire interior of the conduit. The weave transmits fluid via capillary action while simultaneously providing a surface that prevents free flow of fluid out of the conduit.

In another implementation according to the first aspect, the exterior plurality of strands comprise one or more of (1) loose strands separate from one another or (2) a weave. Advantageously, the loose strands may distribute water in many directions from the conduit. The weave transmits fluid via capillary action while simultaneously providing a surface that prevents free flow of fluid out of the conduit.

In another implementation according to the first aspect, the orifices are configured at different radial locations around a circumference of the tubular conduit. Advantageously, orifices configured in this way direct fluid toward multiple radial directions around the conduit.

In another implementation according to the first aspect, the orifices are configured collinearly on the tubular conduit. Advantageously, orifices configured in this way direct fluid in a single radial direction relative to the conduit.

In another implementation according to the first aspect, the orifices are configured at fixed linear intervals along the tubular conduit. Advantageously, the orifices may be staggered at intervals corresponding to intervals for planting crops in a row.

In another implementation according to the first aspect, the fluid permeable material is made of at least one material of a member of a group consisting of: super absorbent polymer (SAP), sodium polyacrylate, and cotton.

In another implementation according to the first aspect, each of the plurality of orifices comprises a peripheral annular sleeve configured to compress the intermediate plurality of strands and thereby prevent fluid from flowing between said intermediate plurality of strands. The sleeve thus assures that only a limited quantity of fluid flows from the conduit.

According to a second aspect, an apparatus comprises first means for delivering water from a water source, and at least one second means for inserting at least one third means into the first means. The at least one third means is configured at least partially within the first means and is configured for delivering water from the first means, through the second means, and to an exterior of the first means.

Advantageously, the second means may be arranged in the first means to distribute the fluid at desired intervals, while the second means spread the fluid in multiple directions from each of the orifices, to ensure sufficient delivery of fluid to the targeted areas.

In another implementation according to the second aspect, at least one fourth means is configured within the at least one second means and configured to compress the at least one third means and thereby control the delivery of water by the at least one third means. The fourth means thus assures that only a limited quantity of fluid flows from the conduit.

In another implementation according to the second aspect, the at least one third means comprises fifth means located within the first means for delivering water from the interior of the first means to the second means; sixth means located within the second means for delivering water through the second means, and seventh means located external to the first and second means for delivering water outside of the first means. Advantageously, the fifth, sixth, and seventh means may be used to efficiently deliver water from within the first means to outside the first means.

In another implementation according to the second aspect, the at least one third means is for flowing a fluid therethrough by force of capillary action, cohesion, adhesion, and/or other molecular forces. Advantageously, no additional energy source is required to distribute the fluid.

In another implementation according to the second aspect, the first means is a longitudinal tubular conduit, the second means is an orifice, and the third means is a plurality of strands made of a fluid permeable material.

In another implementation according to the second aspect, the fourth means is a sleeve.

In another implementation according to the second aspect, the fifth means is an interior plurality of strands; the sixth means is an intermediate plurality of strands interlaced with the interior plurality of strands, and the seventh means is an exterior plurality of strands interlaced with the intermediate plurality of strands.

According to a third aspect, a method of implanting a longitudinal tubular conduit in soil is disclosed. The tubular conduit comprises a plurality of orifices extending along a longitudinal axis of the tubular conduit. Within each of the plurality of orifices, an interior plurality of strands passes from the orifice to an interior of the tubular conduit, an exterior plurality of strands pass from the orifice to an exterior of the tubular conduit, and an intermediate plurality of strands is interlaced with the interior and exterior plurality of strands and is configured at least partially within the orifice. Each of the interior plurality of strands, exterior plurality of strands, and intermediate plurality of strands are made of a fluid permeable material. The method comprises furrowing a soil along a longitudinal axis of ground for creating a furrow, positioning said tubular conduit in and along said furrow, said tubular conduit formed to dispense fluids to said soil solely by force of soil suction and gravity; and covering said tubular conduit with soil displaced by said furrow.

In another implementation according to the third aspect, the method further comprises adding a different soil having a property of uniform porosity into the furrow, positioning the tubular conduit on the uniformly porous soil, and covering the tubular conduit with a layer of the uniformly porous soil.

An advantage of the present invention, in some embodiments, is that the device comprises little or no loss of fluid due to evaporation. The irrigation pipe is buried within soil, such that exposure of the fluid to air is much less than in drip irrigation or in a sprinkler system.

Another advantage of the present invention, in some embodiments, is that the device comprises controlled distribution of water along a length of an irrigation pipe. The force used to withdraw water from the irrigation pipe is not affected by the length of the irrigation pipe. Furthermore, the locations of the orifices and the selection material of the strands may be configured to allow targeted delivery of fluid around the circumference of the irrigation pipe.

Another advantage of the present invention, in some embodiments, is that there is little or no requirement for fluid pressure to withdraw fluid from the irrigation pipe. As explained above, the force used to withdraw fluids from the irrigation pipe are molecular forces, for example capillary action, such that pressure does not need to be applied to the fluid to force the fluid to exit the irrigation pipe.

In some embodiments, molecular forces are utilized to distribute water. Molecular forces of water are the mechanism that plants utilize to draw water from soil into roots, and to raise water against the force of gravity from the roots up into the plant or tree body and leaves. The current invention, in some embodiments thereof, utilizes molecular forces of water to draw water from a conduit into surrounding soil without application of pressure or other outside forces. The property of soil to attract water is referred to as soil suction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
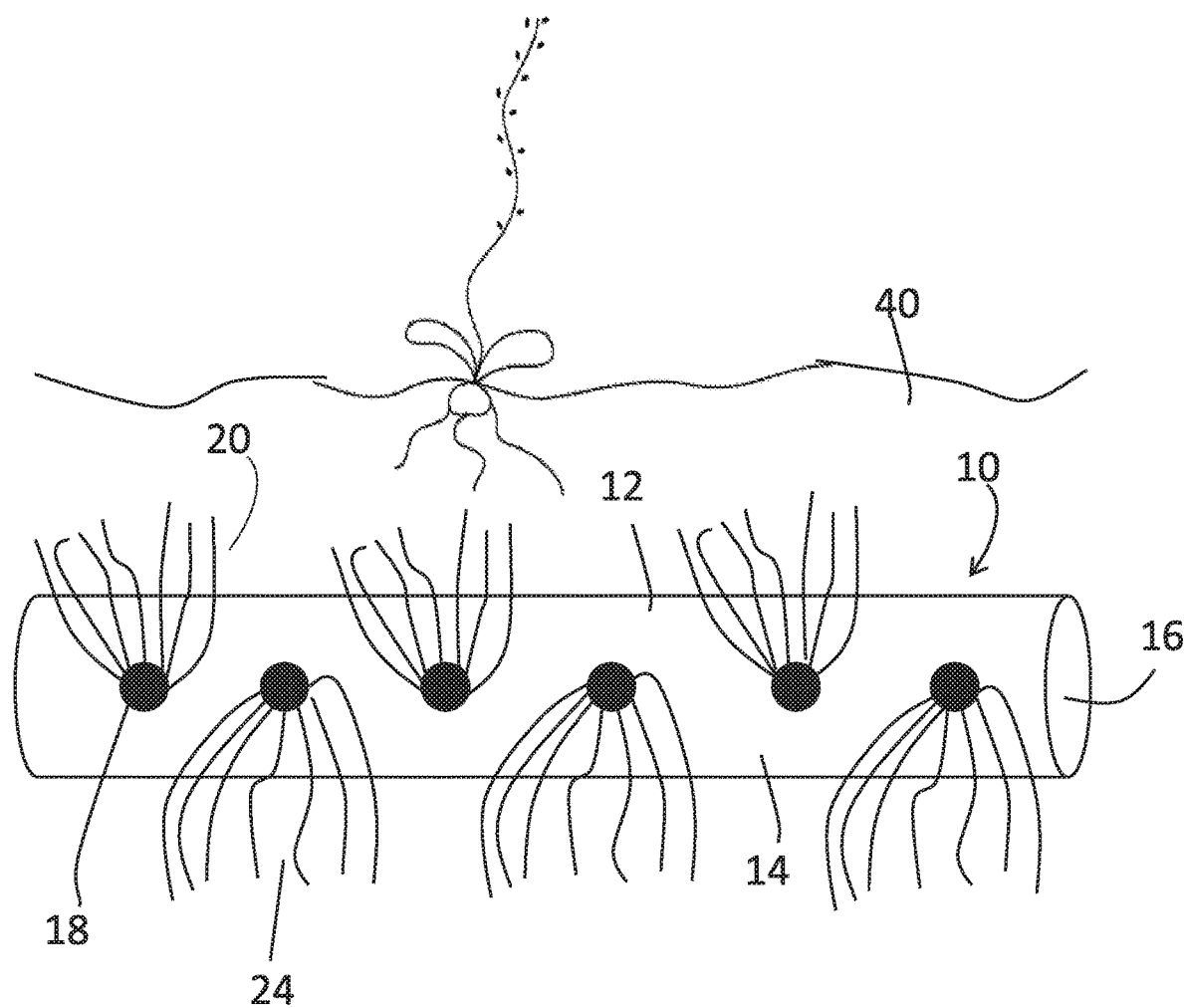
FIG. 1 is a schematic view of a tubular conduit embedded in soil, according to embodiments of the invention.

The present invention, in some embodiments thereof, relates to irrigation with uniform fluid distribution under low fluid pressure and, more specifically, but not exclusively, to a device that employs molecular forces to distribute water from a conduit to the soil.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIG. 1, device 10 includes tubular conduit 12 embedded in soil 40. Tubular conduit 12 includes exterior surface 14 and interior surface 16. Tubular conduit 12 allows water and/or any other viscous fluid, referred to herein as fluid, to flow therein. In an exemplary embodiment, tubular conduit 12 has a diameter of 20 mm and a thickness of 1 mm (i.e., between exterior and interior surfaces 14, 16). Orifices 18 are configured in tubular conduit 12 and extend between exterior surface 14 and interior surface 16. In the illustrated embodiment, orifices 18 are configured collinearly on the tubular conduit 12. In an alternative embodiment, the orifices are configured at different radial locations around a circumference of the tubular conduit 12.

Strands 20 are configured in orifices 18. Strands 20 are comprised of a fluid permeable material that is configured to deliver fluid from interior 16 to exterior 14 of the tubular conduit 12. Examples of such materials include super absorbent polymer (SAP), sodium polyacrylate, and cotton. As fluid flows through tubular conduit 12, strands 20 are moistened. Fluid is capable of flowing through strands 20 by force of capillary action, cohesion, adhesion, and/or other molecular forces.

In the section of strands 20 visible in FIG. 1, there are seven exterior sub-strands 24. The selection of seven sub-strands 24 is merely for illustrative purposes, and there may be fewer or more than seven exterior sub-strands 24. Similarly, in the illustrated embodiment, sub-strands 24 are depicted as extending substantially vertically relative to the conduit 12. This configuration is merely illustrative, and, in other configurations, sub-strands 24 may spread in all radial directions relative to the conduit 12.

Soil comprises many small grains with air between them. The force of soil suction manifests in empty spaces between the grains of soil. The molecular force of adhesion, the attraction of a fluid to other materials, applies a force on fluids to adhere to proximal surfaces, for example grains of soil. The molecular force of cohesion, the attraction of a fluid to itself, prevents a drop from detaching as fluid adheres to other substances, causing a continuous flow of fluid.

The present invention, in some embodiments thereof, uses the force of soil suction to distribute a fluid from tubular conduit 12 to soil 40, via strands 20. When tubular conduit 12 is filled with a fluid and strands 20 are in contact with soil 40, for example, when tubular conduit 12 is buried in soil, soil suction draws fluid from the strands 20 into the soil 40. Optionally, strands 20 comprise a material that, in the absence of other forces, the forces of adhesion and cohesion are sufficient to cause a fluid to flow through strands 20.

Figure 2A:
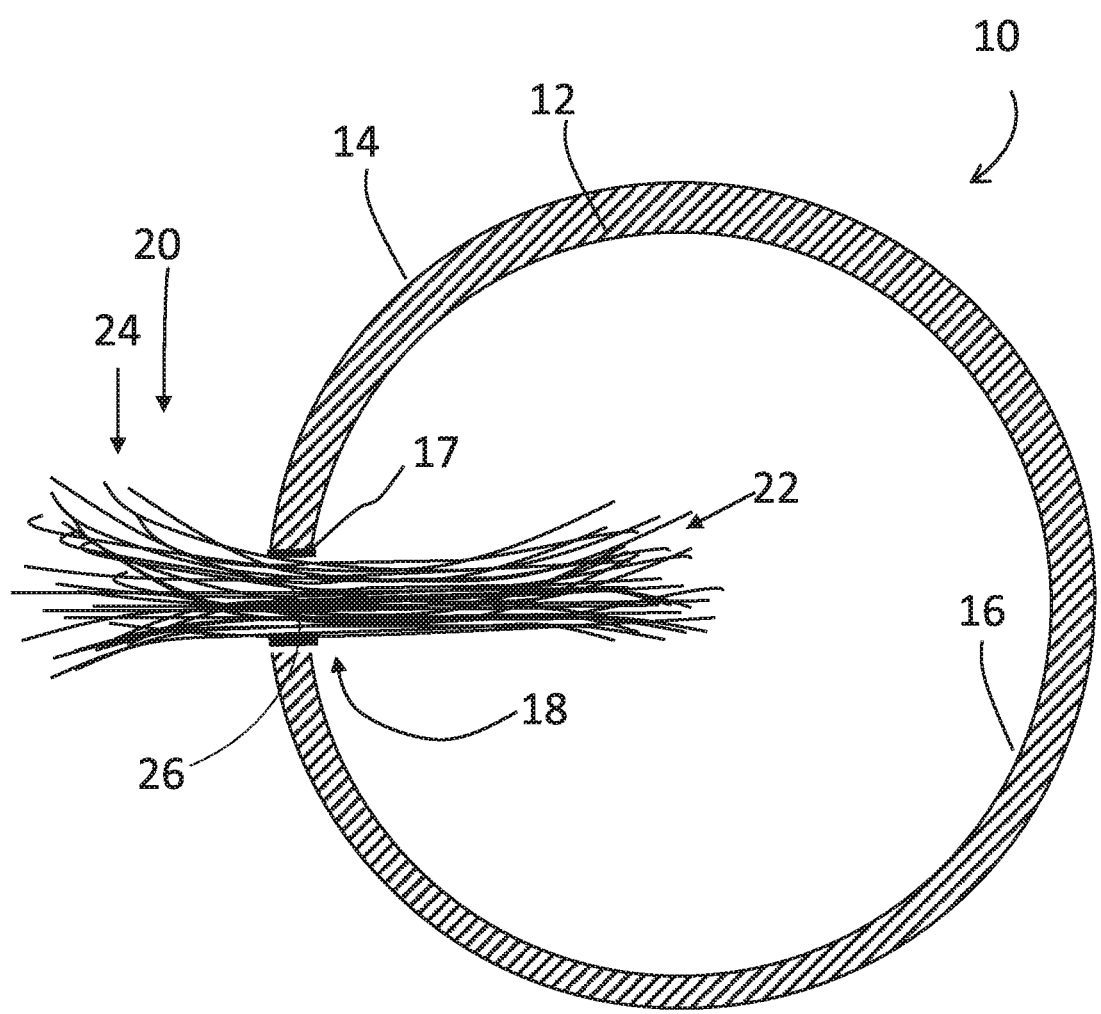
FIG. 2A is a cross-section view of the tubular conduit of FIG. 1, according to embodiments of the invention.

Referring to FIG. 2A, a cross-section of tubular conduit 12 is shown, which illustrates the structure and function of the strands 20 in greater detail. As shown in FIG. 2A, each of the strands 20 comprises interior sub-strands 22, exterior sub-strands 24, and intermediate portion 26. Interior sub-strands 22 and exterior sub-strands 24 are interlaced with intermediate portion 26. As used in the present disclosure, the term "interlaced with" encompasses a configuration in which sub-strands 22, 24, and 26 are made of a single strand 20, as depicted in FIG. 2A.

The strands 20 are introduced into the orifices 18 of the tubular conduit 12 under pressure. In the embodiment of FIG. 2A, each orifice 18 is defined by annular edges 17, which are formed of the same material as the tubular conduit 12. A sufficient number of strands 20 are introduced into the orifices 18 such that the strands 20 are tightly packed within the orifices 18. In an embodiment, the strands 20 are packed into the orifices 18 under sufficient pressure such that fluid cannot escape the orifices 18 except via forces of capillary action.

As illustrated in FIG. 2A, interior sub-strands 22 and exterior sub-strands 24 are loose strands, i.e., strands that are not physically attached to each other. An advantage of this configuration is that the loose strands 22 may spread out to draw water from all portions of the conduit 12, and the loose strands 24 may spread out to deliver water in all radial directions from the orifices 18.

Figure 2B:
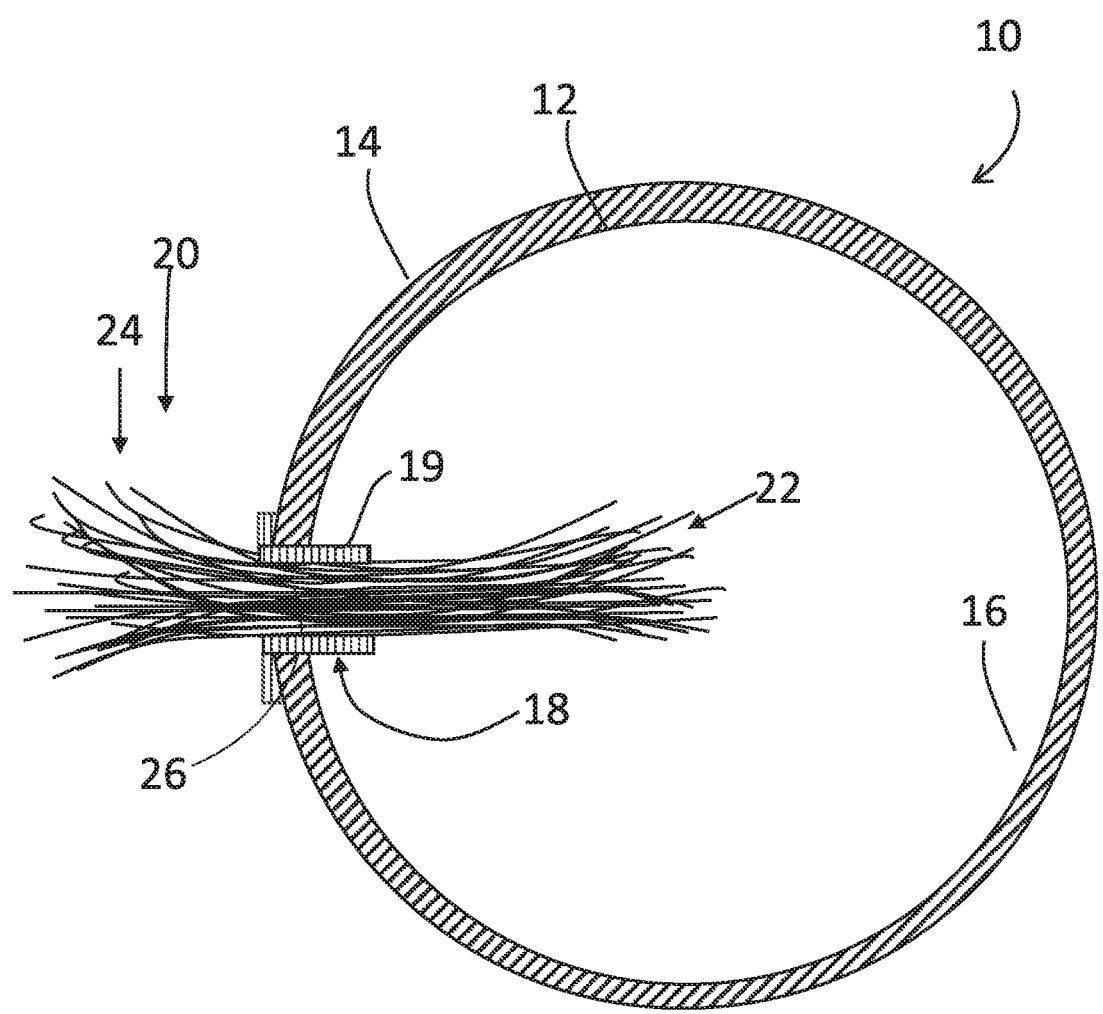
FIG. 2B is a cross-section view of the tubular conduit of FIG. 2A, showing a sleeve in the orifice, according to embodiments of the invention.

Attention is now drawn to FIG. 2B, which depicts an alternative configuration of the orifice 18. In most respects, FIG. 2B is identical to FIG. 2A, and accordingly, the same reference numerals are used for both Figures. FIG. 2B differs from FIG. 2A in that the annular edges 17 of orifices 18 are lined with sleeves 19. Sleeves 19 are made of a watertight material. The sleeves 20 may be made of a solid material or an elastic material. Sleeves 19 may compress the intermediate portions 26 of strands 20 within the orifices 18, and thereby prevent fluid from flowing between said intermediate portions 26 of strands 20. Sleeves 19 may be also advantageous for reducing the diameter of orifices 18, for example, when the orifice 18 would otherwise fit more strands 20 than is necessary to irrigate the surrounding area.

Figure 3:
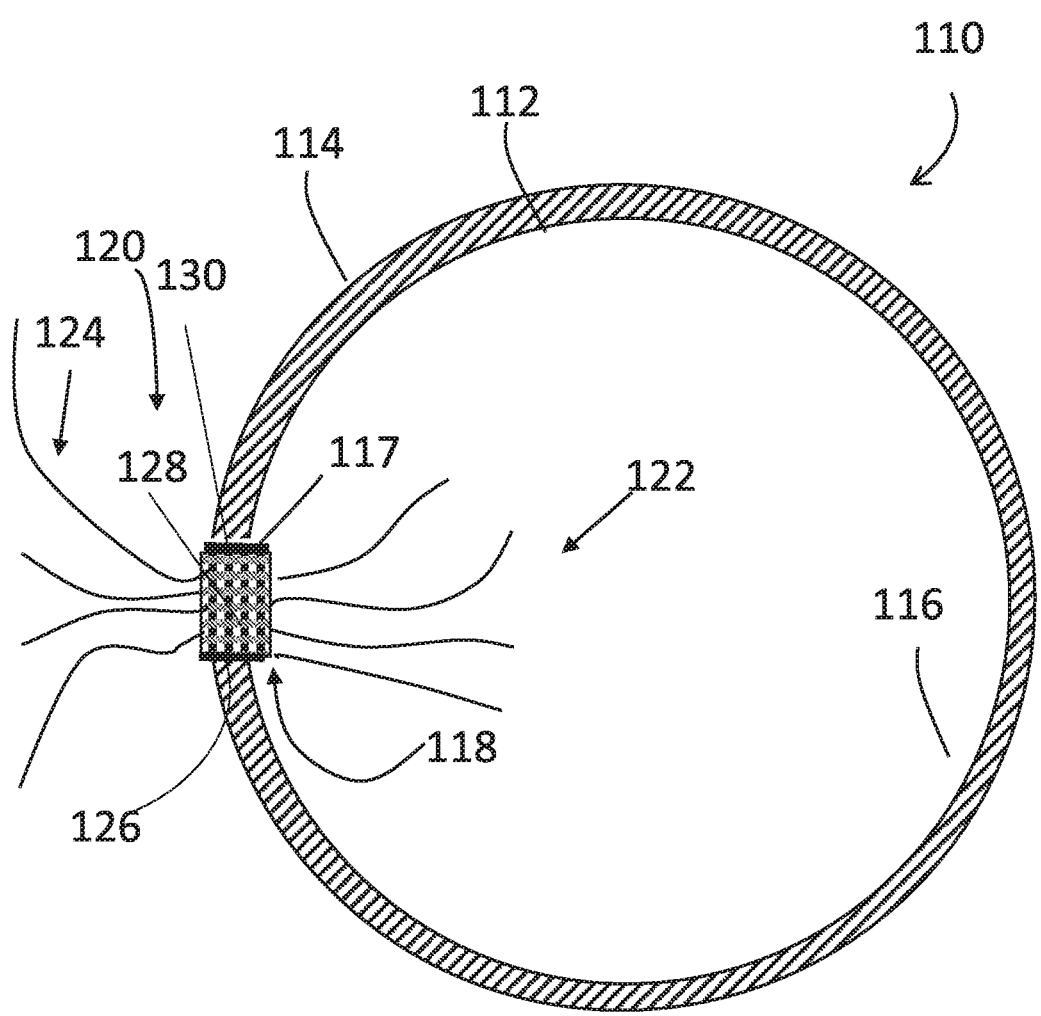
FIG. 3 is a cross-section view of a second embodiment of a tubular conduit, incorporating a woven sheet, according to embodiments of the invention.
Figure 4:
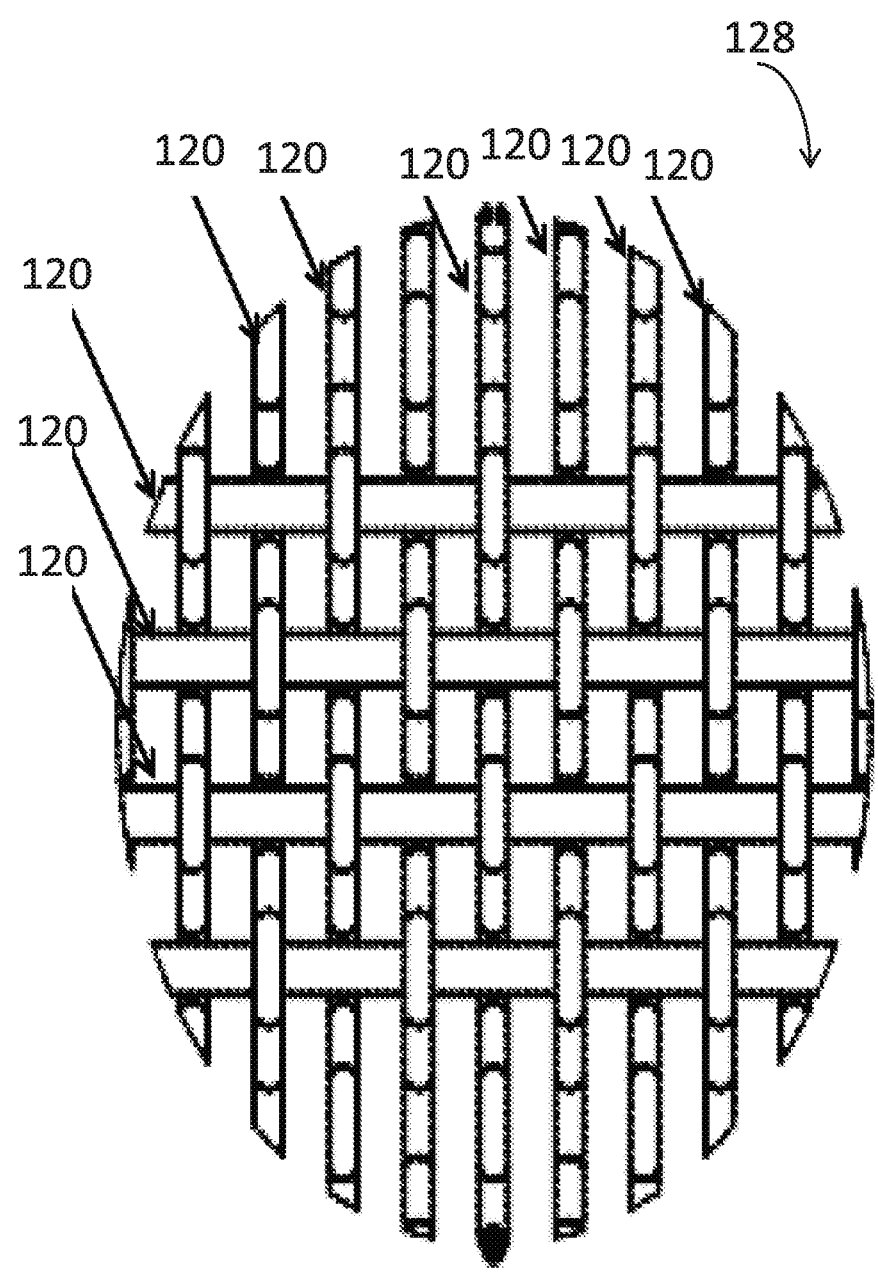
FIG. 4 is a magnified view of an exemplary sheet woven from numerous strands suitable for use with the embodiment of FIG. 3, according to embodiments of the invention.

Reference is now made to FIG. 3, which discloses an alternative embodiment 110 of device 10, including tubular conduit 112. Device 110 is substantially similar to tubular conduit 10, and accordingly similar elements are assigned a similar reference numeral, except that the reference numerals begin with "1." The main difference between the embodiments of FIGS. 2A and 2B and FIG. 3 is that, in FIG. 3, the intermediate portion 126 of strands 120 comprises weave 128. Weave 128 is made of a mesh woven of numerous strands 120, as seen in FIG. 4. Fluid flows through the strands 120 by force of capillary action, cohesion, adhesion, and/or other molecular forces. Optionally, weave 128 is woven of strands 120 that have a physical property such that the forces of adhesion and cohesion are sufficient to cause a fluid to flow within strands 120 in the absence of other forces. The weave 128 may encompass other properties such as those disclosed in connection with the fluid permeable sheet material of U.S. Pat. No. 10,182,535. Interior and exterior sub-strands 122, 124 may be comprised of extensions of strands 120 that comprise the weave 128.

Optionally, spaces between strands 20 or strands 120 may be filled with a bonding material 130, as shown schematically in FIG. 3. The bonding material 130 is impervious to the flow of fluid, and thus, in the embodiment of FIG. 3, prevents fluid from flowing out of the tubular conduit 110 in the spaces between strands 120 of weave 128, while permitting fluid to flow via capillary action within the strands 120 of weave 128. Additionally or alternatively, the bonding material 130 may be placed at an interface between weave 128 and the tubular conduit 112, to prevent fluid from flowing around weave 128 to escape tubular conduit 112.

The bonding material comprises a member of a group consisting of adhesive material, welding material, a double sided tape, a silicone layer, a heat sealing material, and impulse sealing material.

In the illustrated embodiment, weave 128 occupies a dimension corresponding to the thickness of tubular conduit 112. Interior sub-strands 122 occupy the interior 116 of tubular conduit 112, and exterior sub-strands 124 are located exterior to tubular conduit 112. In alternative embodiments, the weave 128 may occupy a larger dimension, such that the weave 128 extends into the interior 116 of the tubular conduit 112, or extends out of tubular conduit 112 and into the soil.

Figure 5:
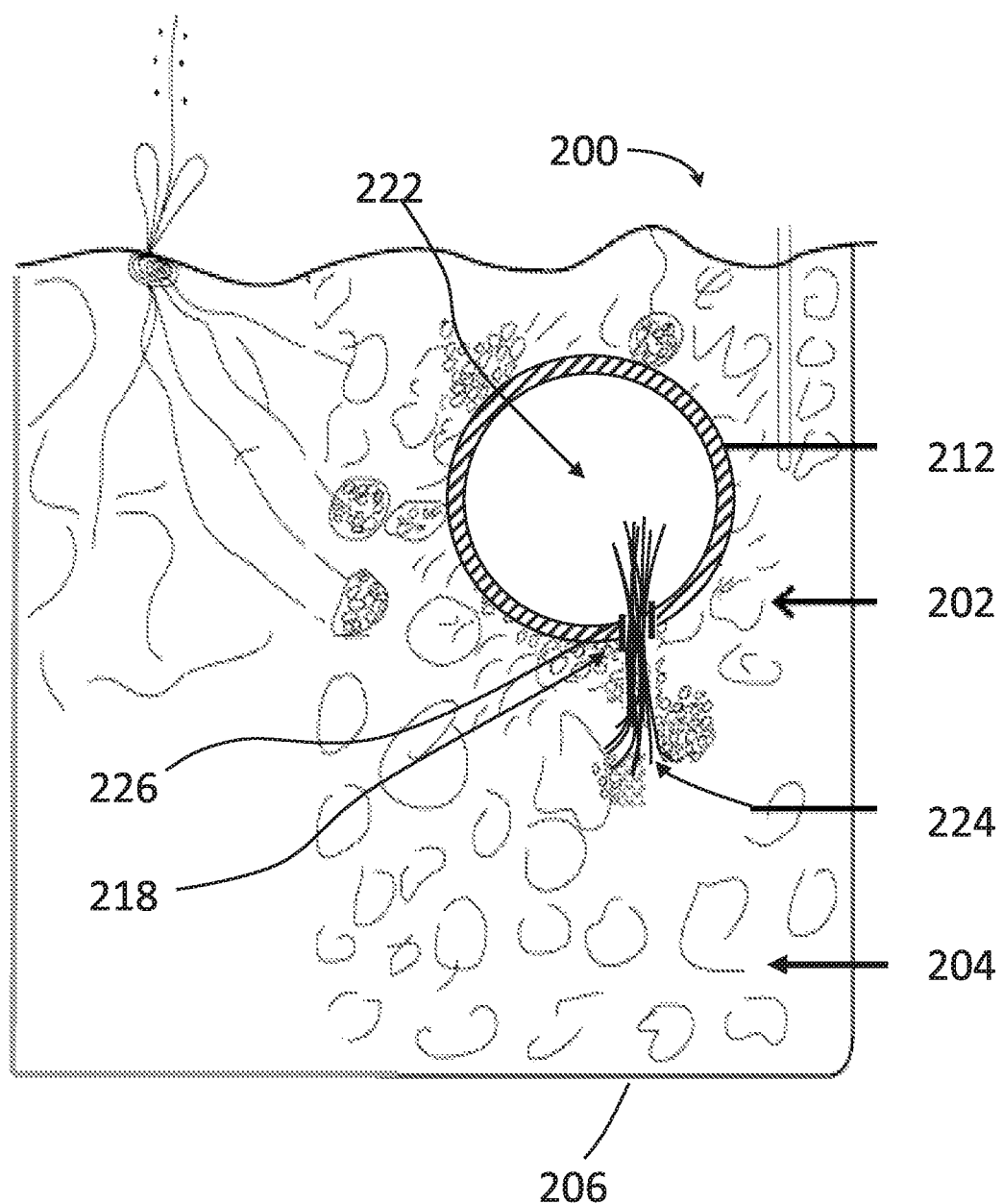
FIG. 5 is an exemplary illustration of a method for implanting a tubular conduit with a fluid permeable material, in accordance with some embodiments of the present invention.

Reference is now made to FIG. 5, an exemplary illustration of a method and system for implanting a tubular conduit with a fluid permeable material in a soil, in accordance with some embodiments of the present invention. As seen in FIG. 5, system 200 includes tubular conduit 212 embedded in a furrow. The furrow may be encased by furrow casing 206, which may be, for example, made of nylon or another water-permeable material. Tubular conduit 212 comprises a plurality of orifices 218 extending along a longitudinal axis of said tubular conduit. Within each of the plurality of orifices 218 an interior plurality of strands 222 pass from the orifice 218 to an interior of the tubular conduit 212, an exterior plurality of strands 224 pass from the orifice 218 to an exterior of the tubular conduit 212. An intermediate plurality of strands 226 are interlaced with the interior and exterior plurality of strands 222, 224 and configured at least partially within the orifice 218. Each of the interior plurality of strands 222, exterior plurality of strands 224, and intermediate plurality of strands 226 are made of a fluid permeable material, as discussed above.

A furrow is dug in a soil along a longitudinal axis, and tubular conduit 212 is positioned in and along the furrow. Tubular conduit 212, when connected to a fluid source, may dispense fluids to the soil via the strands 222, 224, 226 by force of soil suction. The furrow containing tubular conduit 212 is filled with soil displaced by the furrow.

As seen in FIG. 5, optionally, a different soil, 202, may be added to the furrow than the soil 204 located below the furrow. The different soil 202 may be uniformly porous. When different soil 202 is added to the furrow, the tubular conduit 212 is positioned on top of a layer of soil 202, and an additional layer of different soil 202 is placed on top of the tubular conduit 212 such that the furrow is filled.

A uniformly porous soil will exert a more uniform force of soil suction over the length of a furrow than soil which is not uniformly porous. The amount of fluid drawn from the tubular conduit 212 is proportional to the force of soil suction, such that a uniformly porous soil along a longitudinal furrow draws a uniform amount of fluid along the longitudinal furrow.

It is expected that during the life of a patent maturing from this application many fluid permeable materials and bonding materials will be developed and the scope of the terms "strand," "fluid permeable," and "bonding material" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A flowing water channel device, comprising:
a tubular conduit made of fluid impervious material;
a plurality of orifices extending along a longitudinal axis of said tubular conduit;
within each of the plurality of orifices:
an interior plurality of strands passing from the orifice to an interior of the tubular conduit, an exterior plurality of strands passing from the orifice to an exterior of the tubular conduit, and an intermediate plurality of strands interlaced with the interior and exterior plurality of strands and configured at least partially within the orifice;
wherein each of the interior plurality of strands, exterior plurality of strands, and intermediate plurality of strands is made of a fluid permeable material,
wherein each of the plurality of orifices comprises a peripheral annular sleeve configured to compress the intermediate plurality of strands and thereby permit flow of fluid within each orifice via only the intermediate plurality of strands, by force of capillary action, cohesion, adhesion, and/or other molecular forces, and to prevent free flow of fluid through each of the plurality of orifices in spaces between the intermediate plurality of strands.

2. The flowing water channel device of claim 1, wherein said fluid permeable material comprises material wherein fluid may flow through said material solely by force of capillary action, cohesion, adhesion, and/or other molecular forces.

3. The flowing water channel device of claim 1, wherein the intermediate plurality of strands comprises a weave of said plurality of intermediate strands, such that a fluid may flow through said intermediate plurality of strands by force of capillary action, cohesion, adhesion, and/or other molecular forces.

4. The flowing water channel device of claim 1, wherein said fluid permeable material comprises a weave made of material capable of transmitting fluid by capillary action.

5. The flowing water channel device of claim 1, wherein the interior plurality of strands comprise one or more of (1) loose strands separate from one another or (2) a weave.

6. The flowing water channel device of claim 1, wherein the exterior plurality of strands comprise one or more of (1) loose strands separate from one another or (2) a weave.

7. The flowing water channel device of claim 1, wherein the orifices are configured at different radial locations around a circumference of the tubular conduit.

8. The flowing water channel device of claim 1, wherein the orifices are configured collinearly on the tubular conduit.

9. The flowing water channel device of claim 1, wherein the orifices are configured at fixed linear intervals along the tubular conduit.

10. The flowing water channel device of claim 1, wherein the fluid permeable material is made of at least one material of a member of a group consisting of: super absorbent polymer (SAP), sodium polyacrylate, and cotton.

11. An apparatus comprising:
first means for delivering water from a water source;
at least one second means for inserting a plurality of third means into the first means; and
wherein the plurality of third means are configured at least partially within the first means and configured for delivering water from the first means, through the second means, and to an exterior of the first means; and
at least one fourth means configured within each of the at least one second means and configured to compress the plurality of third means and thereby permit flow of fluid within each second means via only the third means, by force of capillary action, cohesion, adhesion, and/or other molecular forces, and to prevent free flow of fluid through each of the plurality of second means in spaces between the plurality of third means.

12. The apparatus of claim 11, wherein the at least one third means comprises fifth means located within the first means for delivering water from the interior of the first means to the second means; sixth means located within the second means for delivering water through the second means, and seventh means located external to the first and second means for delivering water outside of the first means.

13. The apparatus of claim 12, wherein the fifth means is an interior plurality of strands; the sixth means is an intermediate plurality of strands interlaced with the interior plurality of strands, and the seventh means is an exterior plurality of strands interlaced with the intermediate plurality of strands.

14. The apparatus of claim 11, wherein the at least one third means is for flowing a fluid therethrough by force of capillary action, cohesion, adhesion, and/or other molecular forces.

15. The apparatus of claim 11, wherein the first means is a longitudinal tubular conduit, the second means is an orifice, and the plurality of third means comprise a plurality of strands made of a fluid permeable material.

16. The apparatus of claim 11, wherein the fourth means is a sleeve.

17. A method of implanting a longitudinal tubular conduit in soil, said tubular conduit comprising a plurality of orifices extending along a longitudinal axis of said tubular conduit, within each of the plurality of orifices an interior plurality of strands passing from the orifice to an interior of the tubular conduit, an exterior plurality of strands passing from the orifice to an exterior of the tubular conduit, and an intermediate plurality of strands interlaced with the interior and exterior plurality of strands and configured at least partially within the orifice, wherein each of the interior plurality of strands, exterior plurality of strands, and intermediate plurality of strands are made of a fluid permeable material, wherein each of the plurality of orifices comprises a peripheral annular sleeve configured to compress the intermediate plurality of strands and thereby permit flow of fluid within each orifice via only the intermediate plurality of strands, by force of capillary action, cohesion, adhesion, and/or other molecular forces, and to prevent free flow of fluid through each of the plurality of orifices in spaces between the plurality of intermediate strands, the method comprising:
furrowing a soil along a longitudinal axis of ground for creating a furrow;

positioning said tubular conduit in and along said furrow, said tubular conduit formed to dispense fluids to said soil solely by force of soil suction and gravity; and covering said tubular conduit with soil displaced by said furrow.

18. The method of claim 17, further comprising adding a soil having a property of uniform porosity into said furrow, positioning said tubular conduit on said uniformly porous soil, and covering said tubular conduit with a layer of said uniformly porous soil.

* * * * *